(12) United States Patent
Yli-Kovero

(10) Patent No.: US 10,911,842 B2
(45) Date of Patent: Feb. 2, 2021

(54) SAUNA MONITORING SYSTEM AND METHOD

(71) Applicant: Risto Tapio Yli-Kovero, Hämeenlinna (FI)

(72) Inventor: Risto Tapio Yli-Kovero, Hämeenlinna (FI)

( * ) Notice: Subject to any disclaimer, the term of this patent is extended or adjusted under 35 U.S.C. 154(b) by 0 days.

(21) Appl. No.: 16/339,112

(22) PCT Filed: Oct. 5, 2017

(86) PCT No.: PCT/FI2017/050700
§ 371 (c)(1),
(2) Date: Apr. 3, 2019

(87) PCT Pub. No.: WO2018/065671
PCT Pub. Date: Apr. 12, 2018

(65) Prior Publication Data
US 2019/0238957 A1    Aug. 1, 2019

(30) Foreign Application Priority Data

Oct. 6, 2016 (FI) ...................................... 20165751

(51) Int. Cl.
*H04Q 9/00* (2006.01)
*A61H 33/06* (2006.01)
(Continued)

(52) U.S. Cl.
CPC .............. *H04Q 9/00* (2013.01); *A61H 33/06* (2013.01); *A61H 33/063* (2013.01); *G08C 19/00* (2013.01); *H04L 12/40* (2013.01); *A61H 2201/0176* (2013.01); *A61H 2201/0207* (2013.01); *A61H 2201/5007* (2013.01); *A61H 2201/5012* (2013.01); *A61H 2201/5071* (2013.01); *A61H 2201/5082* (2013.01); *A61H 2201/5089* (2013.01); *A61H 2201/5092* (2013.01)

(58) Field of Classification Search
CPC .................. A61H 2201/5007; A61H 33/06
See application file for complete search history.

(56) References Cited

U.S. PATENT DOCUMENTS

| | | | | |
|---|---|---|---|---|
| 2002/0071535 A1* | 6/2002 | Da Silva | ................. | E03C 1/055 379/102.01 |
| 2002/0082727 A1* | 6/2002 | Laflamme | .......... | A61H 33/0087 700/65 |
| 2013/0265173 A1 | 10/2013 | Millar | | |

FOREIGN PATENT DOCUMENTS

| CN | 204856140 U | 12/2015 |
|---|---|---|
| CN | 205031528 U | 2/2016 |

(Continued)

OTHER PUBLICATIONS

Search Report of the Finnish Patent and Registration Office, Application No. 20165751, dated May 8, 2017, 2 pages.
(Continued)

*Primary Examiner* — Fabricio R Murillo Garcia
(74) *Attorney, Agent, or Firm* — Ziegler IP Law Group, LLC

(57) ABSTRACT

A sauna monitoring method and system, in which an interfacing unit receives measurement information from a plurality of sensors and outputs the measurement information over a digital bus. An access unit receives the measurement information from the digital bus sends the measurement information to one or more recipients in the Internet.

10 Claims, 2 Drawing Sheets

(51) Int. Cl.
*G08C 19/00* (2006.01)
*H04L 12/40* (2006.01)

(56) References Cited

FOREIGN PATENT DOCUMENTS

| | | |
|---|---|---|
| DE | 10011660 C1 | 7/2001 |
| DE | 102007037110 A1 | 2/2009 |
| DE | 102012014952 A1 | 1/2014 |
| DE | 202015003999 U1 | 12/2015 |
| EP | 1123077 A1 | 8/2001 |
| JP | 2000276239 A | 10/2000 |
| JP | 2008086585 A | 4/2008 |
| WO | 2007073588 A2 | 7/2007 |
| WO | WO-2007073588 A2 * 7/2007 ............. A61H 33/06 | |
| WO | 2011004015 A2 | 12/2011 |

OTHER PUBLICATIONS

Extended European Search Report, Application No. 17857898.5, dated Mar. 12, 2020, 7 pages.

\* cited by examiner

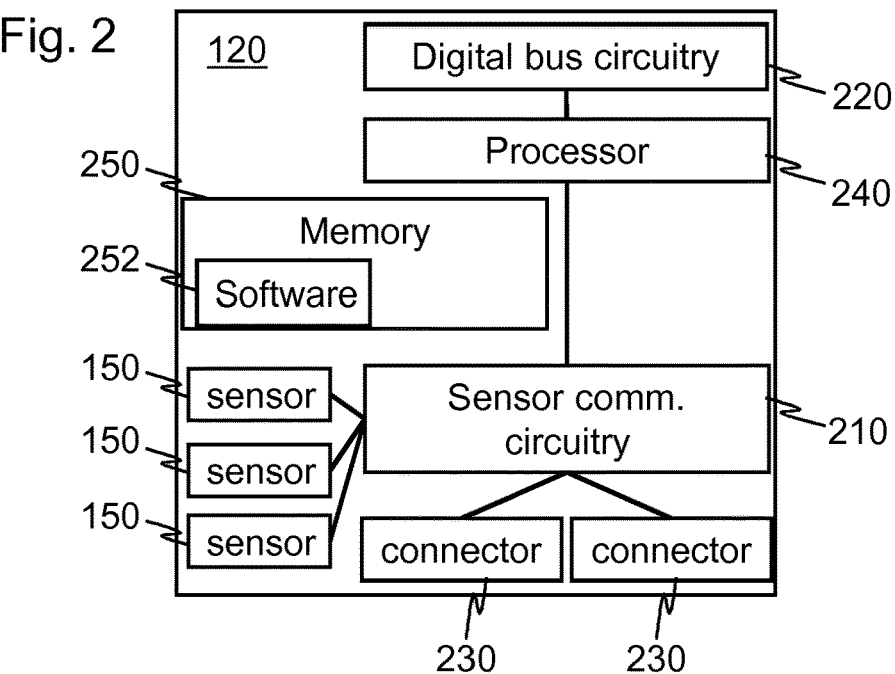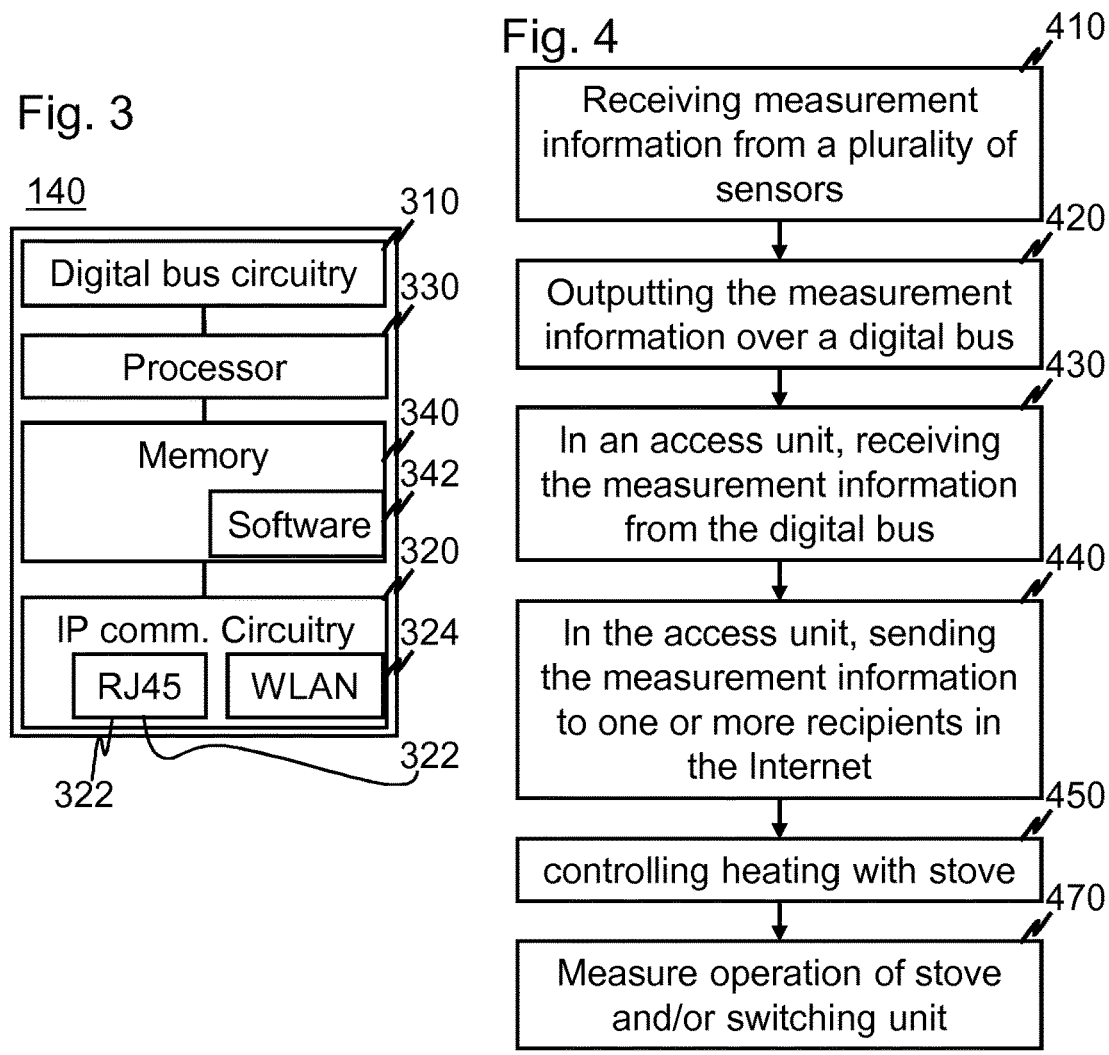

SAUNA MONITORING SYSTEM AND METHOD

TECHNICAL FIELD

The present disclosure relates to sauna monitoring system and to a sauna monitoring method.

BACKGROUND

This section illustrates useful background information without admission of any technique described herein representative of the state of the art.

Sauna is a room in which the conditions are very variable. The temperature and humidity vary significantly from idle non-heated time to heating time and also during use, as water is often thrown on a sauna stove to increase the humidity. The temperature is typically measured in electric saunas to control the power of the stove and thus to maintain sufficient but not excessive temperature to enable a comfortable experience. In wood-heated saunas, the heating is generally controlled manually by controlling the fuel additions and air intake of the stove. Some people may also open a window to let in cold air from the outside. Some sauna users like to heat the sauna to a temperature well over 100° C., to 120° C. for example, in which case the relative humidity is rather low, such as less than 10%. Some others like to use sauna as if it were a steam sauna in temperatures down to 60° C. and with the relative humidity at 70%. In this document, a sauna refers to a room with a stove configured to heat the air to at least 60° C.

The system in a sauna is also exposed to the accrual of mineral depositions as water evaporated by the stove tends to deposit minerals contained in the water onto surfaces the temperature of which is below the dew point. For example, over-heating bi-metal switches tend to suffer from this phenomenon.

Sauna is best used without any clothing which in many cultures causes that the sauna use is alternated between people of different genders. Yet, it is preferable and in some cases also necessary to supervise or monitor the conditions in the sauna to ensure safety and convenience of its users. In case of a wood-heated sauna, the addition of new batches of wood typically necessitates entry into the sauna and thus enables manual detection of the circumstances inside, although some bigger saunas are equipped with a stove with fuel entry from outside (through the wall). Of course, electric saunas are likewise usable without natural supervision. On the other hand, some wood-heated saunas have relatively long intervals between additions of new batches of wood or after the wood has been burned.

In particular, a chimneyless smoke sauna is typically heated over a relatively long period of time and sometimes also with rather long intervals of batches. In such a sauna, the smoke created by the burning passes through stones of the stove and then exit through wall openings after leaving heat (and soot) on the interior parts such as the bench and walls. During the heating, the carbon dioxide ($CO_2$) and carbon monoxide (CO) concentrations tend to increase and the smoke would irritate eyes, so the bathing in sauna is started after the fire in the stove has died and smoke vanished. Unfortunately, the smoke saunas are prone to burn as wrong type of wood or heating easily lets burning dust to convey with the smoke and set fire. Hence, smoke saunas are heated with particular care.

The aspects of the disclosed embodiments are directed to enhancing the monitoring of the sauna during its heating and use or to at least provide new technical alternative(s).

SUMMARY

According to a first example embodiment of the present disclosure there is provided a sauna monitoring system, comprising:

a sensor interfacing unit comprising a sensor communication circuitry configured to receive measurement information from a plurality of sensors and a first digital bus circuitry configured to output the measurement information over a digital bus;

an access unit comprising:

a second digital bus circuitry configured to receive the measurement information from the digital bus;

an internet communication circuitry; and a processor configured to send the measurement information to one or more recipients in the Internet.

The use of a sensor interfacing unit to connect sensors with an access unit and the sending of the measurement information from the access unit further to the one or more recipients in the Internet may enable easy equipping of existing saunas, whether electric or wood-heated, with modern sauna monitoring sensors and up-to-date reporting through the Internet.

According to a second example embodiment of the present invention there is provided a sauna monitoring method, comprising in an interfacing unit:

receiving measurement information from a plurality of sensors;

outputting the measurement information over a digital bus; and in an access unit:

receiving the measurement information from the digital bus;

sending the measurement information to one or more recipients in the Internet.

BRIEF INTRODUCTION OF DRAWINGS

Some example embodiments of the invention will be described with reference to the accompanying drawings, in which:

FIG. 2 shows a simplified block chart of a sensor interfacing unit;

FIG. 3 shows a simplified block chart of an access unit; and

FIG. 4 shows a flow chart of a simplified sauna monitoring method;

DETAILED DESCRIPTION

Figure 1:
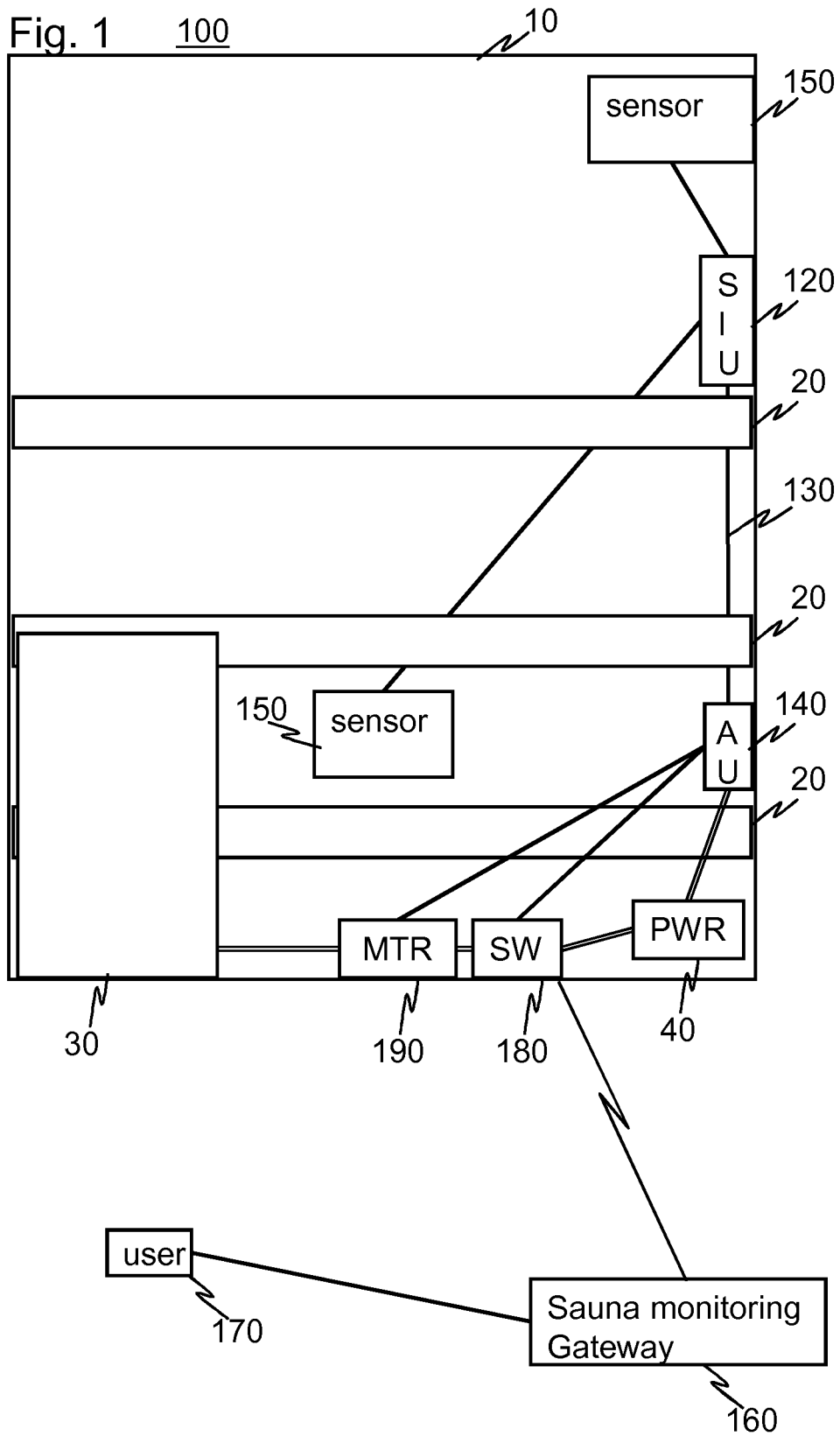
FIG. 1 shows a simplified drawing of an architecture of one embodiment.

In the following description, like reference signs denote like elements or steps.

FIG. 1 shows a simplified drawing of an architecture of one embodiment. FIG. 1 shows a front view of a sauna room 10, with benches 20, a stove 30, a power connector 40 (e.g. a mains socket or a voltage connector inside an electric sauna stove) and a sauna monitoring system 100. The sauna monitoring system 100 comprises a sensor interfacing unit 120, a digital bus 130 and an access unit 140. FIG. 1 further shows some sensors 150 for measuring conditions of the sauna room 10 and a sauna monitoring gateway 160 and a reporting recipient 170 or internet user who can receive the measurement information from the access unit 140 either directly or via the sauna monitoring gateway 160. The sauna monitoring gateway 160 can be, for example, an Internet server or a cloud based functionality. FIG. 1 further shows a controllable switch 180 and a measuring or metering unit 190, which may be provided for controlling electric feed and measuring the feed or the condition of the heating resistors of the stove 30. The controllable switch and the metering unit are here drawn as separate units, although they can be contained in a common housing or housed by the stove 30, the access unit 140 or generally in any suitable casing. The controllable switch 180 can be communicatively connected with the access unit 140.

The metering unit 190 can be configured to measure any of: electric current through the stove 30; voltage before the stove 30; voltage after the stove 30; voltage difference over the stove 30; electric resistance of the stove 30; operating power of the stove 30; and energy consumed by the stove 30. The current, voltage drop and/or power may be measured while the stove 30 is heating. The resistance may be measured during periods when the heating is switched off. The metering unit 190 can be communicatively connected with the access unit 140.

Further possible parts of the sauna monitoring system are shown in FIGS. 2 and 3 that show simplified block charts of the sensor interfacing unit 120 and of the access unit 140, respectively.

The sensor interfacing unit 120 comprises (FIG. 2) a sensor communication circuitry 210 configured to receive measurement information from a plurality of sensors 150 and a first digital bus circuitry 220 configured to output the measurement information over a digital bus 130.

The sensor interfacing unit 120 preferably comprises a housing and the first digital bus circuitry 220 preferably resides in the housing. All or some of the one or more sensors 150 preferably reside in the housing as well. The sensor interfacing unit 120 preferably comprises one or more connectors 230 configured to enable wired connection with one or more sensors (such as sensors) that reside outside the housing. The one or more connectors 230 are preferably plug-in connectors. The connectors can be dedicated for particular types of sensors. The sensor interfacing unit 120 is preferably configured to detect the types of the sensors 150 that are connected thereto. This can be simply arranged by the use of the dedicated connectors. The sensor interfacing unit 120 is preferably configured to signal to the access unit the types of the sensors 150 that are connected thereto.

The sensor interfacing unit 120 preferably comprises a processor 240 configured to control the operation of the sensor interfacing unit 120, such as passing information from sensors 150 received over the sensor communication circuitry to the digital bus 130 over the digital bus circuitry 220. The sensor interfacing unit 120 optionally comprises a memory 250 comprising software or computer program 252 for execution by the processor 240.

The sensor interfacing unit 120 preferably comprises an analog-to-digital converter for converting analog measurement signals to digital form.

The access unit 140 comprises (FIG. 3) a second digital bus circuitry 310 configured to receive the measurement information from the digital bus 130; an Internet communication circuitry 320; and a processor 330 configured to send the measurement information to one or more recipients in the Internet and to generally control operation of the access unit 140. The access unit of FIG. 3 is drawn to further comprise a controllable power switch 180 such as a relay, contactor, semiconductor conductor or power inverter. The controllable power switch 180 can be controlled by the processor 330 using instructions received e.g. over the Internet. Alternatively, the power switch can be located separately from the access unit 140, e.g. into the sauna stove 30, in a dedicated housing or in a switchboard, for example (e.g. fuse cabinet). The controllable switch may comprise two or more independently controllable switching elements for implementing safe temperature control and thermal cutoff functions, for example. The access unit of FIG. 3 further comprises a memory 340 storing software or computer program 342 to be executed by the processor 330.

The digital bus 130 is preferably a wired digital bus such as a universal serial bus, a local area network (such as an Ethernet) bus, a Controller Area Network (CAN) bus. Alternatively, the digital bus is a wireless bus such as a Bluetooth or wireless local area network bus.

The digital bus is preferably configured to distribute energy for the sensor interfacing unit from the access unit. In case of a wireless digital bus, the energy transfer may be performed by beaming energy with alternating electromagnetic field.

The internet communication circuitry preferably comprises a local area network connector 322 (e.g. RJ45) and/or a wireless local area network circuitry 324 for sending the measurement information to the recipient in the internet. For example, the internet communication circuitry comprises a cellular and/or satellite modem configured to enable sending the measurement information to the recipient through a cellular and/or a satellite network, respectively. In an embodiment the internet communication circuitry comprises a power-line carrier communication modem configured to enable sending the measurement information to the recipient over a power line from which the access unit receives operating power.

The sauna monitoring system preferably comprises one or more sensors 150 selected from a group that comprises: a temperature sensor; a humidity sensor; a carbon dioxide sensor; a carbon monoxide sensor; an infrared sensor configured to measure temperature of a predetermined fixed object; a light sensor; a sound level sensor; and a microphone. A separate temperature sensor can be placed at a lower level (e.g. 30 cm to 80 cm up for the top bench or down from the ceiling) so as to produce more meaningful measure of the sauna air temperature in view of the subjective feeling of the people in sauna. Another temperature sensor or an infrared sensor can be used to measure the peak temperatures from the top of the sauna room 10. The light sensor and/or the microphone are used in some embodiments for detecting the use of the sauna (by any of the access unit 140 or the one or more recipients that subsequently receive the measurement information).

In an embodiment a microphone is used to perform sound level or decibel measurement to identify noises that indicate the presence of someone in the sauna. Alternatively, such a sound level sensor is used that is tailored to measure sound level and not suited for recording voice, for example. For example, the door and/or sauna benches may release some rattle even if no water were thrown to vaporize on the stove 30. The presence of a person can automatically detected by the access unit 140, by the sauna monitoring gateway 160 and/or any other entity to which signals of the microphone or derivatives thereof are delivered. The presence information can be used to control heating of the sauna. For example, an electric stove can be controlled to increase its power when the presence of a person is detected or a wood stove air intake (by means of an air intake valve with electric control) can be correspondingly increased to boost the burning of wood therein. As another example, the presence information can be automatically passed onwards in hotels or other organized sauna events to help timing of subsequent arrangements such as catering.

In one embodiment, the microphone is used to implement an intercom functionality that may be terminated over the Internet at a reception of a hotel or other organization that runs the sauna in question. In this case, a loudspeaker is provided in the sauna and connected through the sensor interfacing unit 120. An intercom switch and/or a mute switch may also be provided to be accessible via the sensor interfacing unit 120.

The sensor interfacing unit 120 is preferably configured to detect the types of the sensors 150 that are connected thereto. The sensor interfacing unit 120 is preferably configured to signal to the access unit the types of the sensors 150 that are connected thereto.

The access unit 140 is preferably configured to maintain a sauna monitoring gateway address. The access unit 140 can be configured to contact the sauna monitoring gateway 160 when the access unit 140 is taken to use. The access unit 140 is preferably configured to contact the sauna monitoring gateway 160 when the access unit 140 is reset. The access unit 140 is also preferably configured to receive from the sauna monitoring gateway 160 a reporting address. In an embodiment, the access unit is configured to set as the recipient of the measurement information the reporting address. Alternatively or additionally, the access unit 140 can be configured to set as the recipient of the measurement information the address of the sauna monitoring gateway 160. By sending the measurement information via the sauna monitoring gateway 160, the access unit 140 can be kept in touch with a vendor or other party trusted by the sauna monitoring system 100. Firmware updates and warranty connections can thus be easily and reliably arranged. For example, should any need for recall of the sauna monitoring system 100 or of a stove associated therewith, an announcement of such a need could be conveniently relayed to the end user of the sauna monitoring system 100. Moreover, service reminders could also be conveniently and reliably passed to the end user.

Preferably, the sauna monitoring gateway 160 comprises a web server configured to forward the measurement information to a browser of the end user. Alternatively or additionally, the sauna monitoring gateway 160 may comprise an RSS feed server, email server or any other server configured to provide the measurement information by a push or pull arrangement to the end user or plural of end users.

The sauna monitoring system 100 is preferably configured to issue the measurement information to an Internet user only on successful authentication. The authentication may comprise receiving a secret shared by the sauna monitoring system 100 and the end user(s). The shared secret may comprise an identification code, such as a serial number, of the access unit 140.

The access unit 140 or the sauna monitoring gateway 160 can be configured to send measurement information to the one or more recipients on meeting one or more reporting criteria. The reporting criteria may comprise any of: elapsing of a reporting interval; a measurement value exceeding a predetermined reporting threshold; a measurement value changing rate exceeding a predetermined reporting threshold; and receiving a reporting request. In other words, the measurement information may first be received and stored or buffered until the measurement information is sent on meeting the one or more reporting criteria. The buffering may be performed for a given number of measurements, a given amount of bits (either with or without compression), for a given period of time such as 10 minutes, 30 minutes, 1 hour, 2 hours, 6 hours, 8 hours, 12 hours or one day.

The buffering can be performed in either the sensor interfacing unit 120 or the access unit 140 or in both the sensor interfacing unit 120 and the access unit 140.

The reporting criteria may depend on the current use of the sauna. For example, a high temperature of the ceiling (that can be measured conveniently with an infrared sensor) of the sauna may indicate loose fire when the sauna is not being heated, but a fire alert threshold can be increased on heating the sauna depending on the desired sauna temperature. The desired sauna temperature can be obtained in case of an electric sauna from controlling of the sauna stove. Moreover, the heating of the sauna can be determined by the temperature increasing along a predetermined or empirically established ramp function.

The access unit 140 is preferably configured to computationally compress the measurement information prior to its sending to the one or more recipients so as to reduce data usage in the Internet communications.

The sauna monitoring gateway 160 can be configured to relay the measurement information to respective internet users. The sauna monitoring gateway 160 can be configured, for example, to receive all or some of the reporting criteria from one of the internet users and to transfer same to the access unit to adapt the reporting criteria of a corresponding access unit. For example, the sauna monitoring gateway 160 can be configured to receive various settings such as the reporting criteria, reporting address or addresses (e.g. email addresses, short message addresses, telephone numbers, instant messaging addresses), and local alarm settings.

In a preferred embodiment for simple installation, the access unit 140 and the sensor interfacing unit 120 lack local user interface. However, in some other embodiments, one or both of these is provided with visual or acoustic output unit and/or data entry interface. In one case, there is no separate local data connection but a user is enabled to connect to the access unit 140 through a local area network connection or wireless local area network connection by hosting a built-in web-server in the access unit 140. This option can be used to locally enter various settings and/or monitor values of the sensors so that, for example, the positioning of the sensors can be empirically enhanced. If the access unit 140 or the sensor interfacing unit 120 is provided with an acoustic or visual output, that output can be used in an embodiment to issue a local alarm on meeting or exceeding any alarm threshold. For example, people in the sauna could be warned of dangerously hot and moist air, high carbon monoxide content in the air. In one embodiment, the acoustic or visual output is used to present an estimated time before the sauna will be heated to sufficient bathing temperature or any other information obtained from the monitoring of the sauna.

The access unit 140 can be used additionally as a remote controlling device for the stove with the controllable switch 180. In this case, the stove 30 can be switched on or off remotely as desired. Moreover, the access unit 140 can be used to implement heating control for the stove 30 in addition or instead of its own heating control. For example, the stove 30 could be equipped with a mechanical timer with which heating can be switched on for a desired period such as 0 to 8 hours. The heating can then be controlled by an analog temperature measurement based control circuitry that monitors temperature in the sauna with a mechanical sensor and switches the stove 30 on and off based on given on/off switching temperatures separated by switching hysteresis. However, it may be preferable to then equip the stove 30 with a manual selector that selects which control mode is in use so as to avoid that the stove 30 could be switched on for too long a period. Moreover, such a manual selector could also avoid the problem that the manual timer has switched off the heating and thereafter the controllable power switch could not switch on the stove 30 simply by letting electric current go through to the stove 30.

In view of the foregoing, the access unit 140 may be used to operate as an alternative with the built-in control of the stove 30 within the switch-off temperature of the stove 30. For example, the access unit 140 can be configured to control the heating with the stove 30 based on measured temperature, user preferences and/or humidity in the sauna based on the measurements from the sensors 150. The user preferences can be taken e.g. using a web page provided by the access unit 140 or the sauna monitoring gateway 160.

On using the access unit 140 to control the heating of the stove 30, the existing overheating and/or temperature control can thus be still maintained i.e. the stove can be operated in series with those controls. This may be preferred in case that an existing manual timer should be maintained and selectable for use e.g. by the manual selector mentioned in the foregoing. Alternatively, the access unit can be used to control the heating with the sauna bypassing both the timer and temperature and/or overheating controls of the stove 30, in which case the power switch would be preferably implemented with a direct powering connection to heating resistors of the stove 30.

Instead of switching on/off, the access unit 140 can be used in some embodiments to adjust the heating power of the stove 30 with more than one different heating powers. For example, some of electric resistors could be individually switched on/off, or the entire power supply of the stove 30 could be adjusted e.g. by performing rapid on/off switching (e.g. at a rate >0.1 Hz or at a rate >1 Hz), by altering supply voltage with transformer ratio or with an inverter. Preferably, the power adjustment is made by simply using the power switch 180 to operate on the power supply of the stove 30. Alternatively, the access unit 140 can be configured to adapt operation of the stove 30. This may be particularly useful in case that the stove 30 readily has an electronic heating control circuitry the operation of which could be adjusted with the access unit 140.

Furthermore or alternatively to the use for temperature control, the access unit 140 can be used to provide an overheating protection based on the temperature measured by the sensors 150. Such overheating protection can be more finely tuned to the expected temperature than a mechanical thermal cutoff that must be set to operate at rather high temperatures. If, for example, a user preference is set for 70 □C temperature in the sauna, then the thermal cutoff could be set to 90 □C, for example, or generally to the target temperature of the sauna plus a given delta. On changing the target, the normal cooling of the sauna can also be accounted for.

As an example of advanced use of the access unit 140 for heating control, a web access is provided with the access unit or indirectly with the sauna monitoring gateway 160. The web access (e.g. a web server) is configured to produce a web page that prompts user credentials (user name+ password, for example) and then allows entry of user input. The user input can be, for example, desired heating period (s), target sauna temperature, target sauna temperature index (combination of temperature and humidity). Some of the input may be provided by use of a pre-stored profile such as a use profile. Moreover, the web access can be configured to provide a calendar with which the desired heating periods can be conveniently recorded. This calendar can be shared or synchronized with other calendars.

In addition to monitoring conditions in the sauna and possibly controlling the stove 30, the operation of the stove 30 and/or of the controllable switch can be monitored using the measuring unit 190. For example, if the voltage before and after the sauna stove is measured and reported to the access unit 140 by the measuring unit 190, the access unit 140 can verify from the voltage before the stove 30 that the controllable switch 180 has properly connected/broken voltage supply to the stove 30. In an example embodiment, the controllable switch 180 is equipped with two separately controllable switches for each phase used by the stove 30. One switch operates as for temperature control and another for thermal cutoff. As such, the thermal cutoff may be never used over years or even decades. Now, with controllable action, the roles can be reversed e.g. daily or with each heating interruption: instead of using the same switch to pause heating that was used to start it, the other switch may be controlled open i.e. to function in the heating control role. In effect, the controllable switch may alternate switches used for heating control and thermal cutoff. This could also be done without the measuring unit 190, but with the measuring unit 190 it is simple to verify that the supposedly disconnecting switch really functions properly i.e. the voltage on easy phase drops to zero. Then again, on switching on the heating, the voltage on each phase should rapidly meet the normal mains voltage.

The measuring unit 190 can be used to monitor the condition of the stove 30. Electro-corrosion tends gradually wear the heating resistors of the stove 30 and all the connections are subject to impairing over aging. This tends to increase the resistance and inversely decrease the current and heating power, which can be detected by the measuring unit 190. Moreover, the measuring unit can be used to implement an energy consumption or kWh metering. The measurements or derived indications such as traffic light type indicators can be provided for viewing by a user over the Internet via the sauna monitoring gateway 160, for example. Moreover, an alarm can be issued if e.g. a fault is detected in the operation of any of the controllable switch 180, stove 30 resistors, or the measuring unit 190. For example, if the action of the controllable switch 180 is not reflected by reasonable readings of the measuring unit 190, it can be deduced that one of the measuring unit and the controllable switch 180 is faulty, but then the temperature measurement can indicate which one is at fault. If the temperature increases when the controllable switch 180 is set to be conducting, then apparently the measuring unit 190 has failed. Otherwise, either the switch 180 is probably faulty.

In addition to issuing an alarm (locally by sound/light, for example and/or remotely using the sauna monitoring gateway 160, for example) when something goes wrong, it may be followed up whether action has been taken responsive to an alarm. For example, if an alarm has been issued by more than a given maximum period ago and the failure state remains, a new alarm may be issued and/or the heating may be disabled by forcing the controllable switch to remain disconnected.

FIG. 4 shows a flow chart of a simplified method, comprising in an interfacing unit:

410 receiving measurement information from a plurality of sensors;

420 outputting the measurement information over a digital bus; and in an access unit:

430 receiving the measurement information from the digital bus;

440 sending the measurement information to one or more recipients in the Internet;

450 controlling heating with the stove (e.g. based on the measured temperature and/or instructions received from a user locally or over the Internet; and 460 measure operation of the stove and/or the switching unit 180 (e.g. current power/voltage).

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventor for carrying out the invention. Various other embodiments can be implemented with equivalent means or different combinations of embodiments described in the foregoing. As such, the scope of the disclosure is only restricted by the appended patent claims.

The invention claimed is:

1. A sauna monitoring system, comprising:
a sensor interfacing unit comprising:
a plurality of sensors configured to measure conditions of an environment within a sauna room, the plurality of sensors comprising one or more of a temperature sensor; a humidity sensor; a carbon dioxide sensor; a carbon monoxide sensor; an infrared sensor configured to measure temperature of a predetermined fixed object; a light sensor; and a sound level sensor;
a housing comprising at least two of the plurality of sensors;
within the housing of the sensor interfacing unit, a sensor communication circuitry coupled to the plurality of sensors, and configured to receive measurement information about the environment from the plurality of sensors; and
within the housing of the sensor interfacing unit, a first digital bus circuitry, communicatively coupled to the sensor communication circuitry, and configured to output the measurement information over a digital bus; and
the sauna monitoring system further comprising an access unit, the access unit comprising:
a second digital bus circuitry configured to receive the measurement information from the digital bus;
an Internet communication circuitry; and
a processor configured to send the measurement information to one or more recipients over Internet via the Internet communication circuitry in response to meeting one or more reporting criteria for remote monitoring and control of the sauna room, the one or more reporting criteria comprising any of an elapsing of a reporting interval; a measurement value exceeding a predetermined reporting threshold; a measurement value changing rate exceeding a predetermined reporting threshold; and receiving a reporting request;
the access unit being configured to provide remote heating control of the sauna room by controlling heating of a stove of the sauna room based on instructions received from the one or more recipients over the Internet.

2. The sauna monitoring system of claim 1, further comprising a memory configured to buffer the measurement information for sending to the one or more recipients in the Internet.

3. The sauna monitoring system of claim 2, wherein the digital bus is configured to distribute energy for the sensor interfacing unit from the access unit.

4. The sauna monitoring system of claim 1, wherein the digital bus is configured to distribute energy for the sensor interfacing unit from the access unit.

5. The sauna monitoring system of claim 1, wherein:
the sauna monitoring system further comprises a sauna monitoring gateway communicatively connected with the access unit; and
the sauna monitoring gateway is configured to receive the measurement information from the access unit and to further send the measurement information to the one or more recipients in the Internet when the one or more reporting criteria are met so that the measurement information is sent to the one or more recipients by the processor of the access unit via the sauna monitoring gateway.

6. The sauna monitoring system of claim 1, the one or more reporting criteria being dependent on a current use of the sauna room.

7. The sauna monitoring system of claim 1, further comprising a controllable switch that is configured to enable controlling heating of the stove under control of the access unit.

8. The sauna monitoring system of claim 7 further comprising a measurement unit configured to measure operation or characteristics of the stove.

9. The sauna monitoring system of claim 1, the one or more reporting criteria being dependent on a current use of the sauna room.

10. A method of monitoring a sauna room using a sauna monitoring system that comprises a sensor interfacing unit and an access unit, the method comprising:
the sensor interfacing unit:
measuring conditions of an environment within the sauna room using a plurality of sensors comprising one or more of a temperature sensor; a humidity sensor; a carbon dioxide sensor; a carbon monoxide sensor; an infrared sensor configured to measure temperature of a predetermined fixed object; a light sensor; and a sound level sensor,
wherein at least two of the plurality of sensors; a sensor communication circuitry; and a first digital bus circuitry, are disposed in a housing of the sensor interfacing unit;
receiving by the sensor communication circuitry measurement information about the environment from the plurality of sensors;
communicating the measurement information from the sensor communication circuitry to the first digital bus circuitry; and
outputting the measurement information with the first digital bus circuitry over a digital bus; and
by the access unit:
receiving the measurement information from the digital bus with a second digital bus circuitry; and
sending the measurement information to one or more recipients over Internet via an Internet communication circuitry in response to meeting one or more reporting criteria for remote monitoring and control of the sauna room, the one or more reporting criteria comprising any of an elapsing of a reporting interval;

a measurement value exceeding a predetermined reporting threshold; a measurement value changing rate exceeding a predetermined reporting threshold; and receiving a reporting request;

the method further comprising the access unit providing remote heating control of the sauna room by controlling heating of a stove of the sauna room based on instructions received from the one or more recipients over Internet.

\* \* \* \* \*